United States Patent
Huang et al.

(10) Patent No.: US 9,825,924 B2
(45) Date of Patent: Nov. 21, 2017

(54) FILE SHARING METHOD AND APPARATUS

(71) Applicant: Huawei Device Co., Ltd., Shenzhen (CN)

(72) Inventors: Jiejing Huang, Shenzhen (CN); Huangwei Wu, Shenzhen (CN); Chan Wang, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 154 days.

(21) Appl. No.: 14/847,415

(22) Filed: Sep. 8, 2015

(65) Prior Publication Data

US 2015/0381588 A1    Dec. 31, 2015

Related U.S. Application Data

(63) Continuation of application No. PCT/CN2014/084065, filed on Aug. 11, 2014.

(30) Foreign Application Priority Data

Aug. 27, 2013 (CN) .......................... 2013 1 0378968

(51) Int. Cl.
    *H04L 29/06*      (2006.01)
    *H04L 29/08*      (2006.01)
    (Continued)

(52) U.S. Cl.
    CPC ...... *H04L 63/0435* (2013.01); *G06F 21/6218* (2013.01); *H04L 63/0471* (2013.01);
    (Continued)

(58) Field of Classification Search
None
See application file for complete search history.

(56) References Cited

U.S. PATENT DOCUMENTS 7,380,120 B1 * 5/2008 Garcia ............... G06F 21/6209
                                                          380/200
2011/0022642 A1    1/2011 deMilo et al.
(Continued)

FOREIGN PATENT DOCUMENTS

CN     101833615 A    9/2010
CN     101883100 A    11/2010
(Continued)

OTHER PUBLICATIONS

Foreign Communication From a Counterpart Application, European Application No. 14840724.0, Extended European Search Report dated Apr. 13, 2016, 5 pages.
(Continued)

*Primary Examiner* — Peter Poltorak
(74) *Attorney, Agent, or Firm* — Conley Rose, P.C.

(57) ABSTRACT

A file sharing method and apparatus. The method includes uploading, by a first terminal, each encrypted file to a server for saving, and receiving a uniform resource locator (URL) that is returned by the server and corresponds to a location for saving each encrypted file, generating a key package that includes a shared key and a URL that correspond to a file to be shared, and providing the key package for a second terminal, so that the second terminal acquires a corresponding encrypted file by using the URL in the key package, and decrypts the acquired encrypted file by using the shared key in the key package.

10 Claims, 5 Drawing Sheets

(51) Int. Cl.
*G06F 21/62* (2013.01)
*G06Q 10/00* (2012.01)

(52) U.S. Cl.
CPC ........ *H04L 63/061* (2013.01); *H04L 67/1097* (2013.01); *G06Q 10/00* (2013.01); *H04L 63/0281* (2013.01)

(56) References Cited

U.S. PATENT DOCUMENTS

| | | | |
|---|---|---|---|
| 2011/0126008 | A1 | 5/2011 | Song et al. |
| 2012/0331108 | A1* | 12/2012 | Ferdowsi ............... H04L 67/06 709/219 |
| 2013/0174282 | A1 | 7/2013 | Cui et al. |
| 2014/0103108 | A1 | 4/2014 | Sun et al. |
| 2014/0215210 | A1 | 7/2014 | Wang et al. |

FOREIGN PATENT DOCUMENTS

| | | | |
|---|---|---|---|
| CN | 102457507 | A | 5/2012 |
| CN | 102483792 | A | 5/2012 |
| CN | 102546600 | A | 7/2012 |
| CN | 102638568 | A | 8/2012 |
| CN | 102833353 | A | 12/2012 |
| CN | 103139149 | A | 6/2013 |
| CN | 103188219 | A | 7/2013 |
| CN | 103442059 | A | 12/2013 |
| CN | 104065680 | A | 9/2014 |
| EP | 2544117 | A1 | 1/2013 |
| EP | 2629448 | A1 | 8/2013 |
| WO | 2008042846 | A1 | 4/2008 |

OTHER PUBLICATIONS

Partial English Translation and Abstract of Chinese Patent Application No. CN102457507, Dec. 12, 2015, 5 pages.
Partial English Translation and Abstract of Chinese Patent Application No. CN104065680, Sep. 1, 2015, 14 pages.
Partial English Translation and Abstract of Chinese Patent Application No. CN103442059, Part 1, Nov. 12, 2015, 9 pages.
Partial English Translation and Abstract of Chinese Patent Application No. CN103442059, Part 2, Nov. 12, 2015, 4 pages.
Partial English Translation and Abstract of Chinese Patent Application No. CN103139149, Dec. 12, 2015, 14 pages.
Foreign Communication From A Counterpart Application, PCT Application No. PCT/CN2014/084065, English Translation of International Search Report dated Nov. 19, 2014, 2 pages.

* cited by examiner

FILE SHARING METHOD AND APPARATUS

CROSS-REFERENCE TO RELATED APPLICATIONS

This application is a continuation of International Application No. PCT/CN2014/084065, filed on Aug. 11, 2014, which claims priority to Chinese Patent Application No. 201310378968.3, filed on Aug. 27, 2013, both of which are hereby incorporated by reference in their entireties.

TECHNICAL FIELD

The present disclosure relates to the field of communications technologies, and in particular, to a file sharing method and apparatus.

BACKGROUND

Currently, cloud computing has been applied more widely, and a file can be saved and backed up for a user based on an existing cloud server. More users are also willing to upload their files to a cloud server for saving, to reduce a storage cost.

A cloud server not only can save a file for a user, but also can share, with another user, a file saved by a user.

A method for sharing a file on a cloud server is as follows: A user A compresses 1000 files into a file package and encrypts the file package, and uploads the encrypted file package to the cloud server for saving. If the user A intends to share 100 files in the 1000 files with a user B, the user A first retrieves the encrypted file package from the cloud server and decrypts the encrypted file package to acquire the 1000 files in the encrypted file package; then, among the 1000 files, the user A compresses the 100 files to be shared into a file package and encrypts the file package, compresses other 900 files into another file package and encrypts the file package, and uploads the two encrypted file packages to the cloud server for saving; and finally, the user A notifies the user B of a key of the encrypted file package in which the 100 files to be shared are located and a uniform resource locator (URL) used by the cloud server to save the encrypted file package. The user B can acquire, from the cloud server by using the URL, the encrypted file package in which the 100 files are located, and use the key that is notified by the user A to decrypt the encrypted file package, so as to acquire the 100 files in the encrypted file package.

As can be seen, in the method for sharing a file on a cloud server, files that have been already saved on the cloud server need to be changed; moreover, if the user A also intends to share other files with a user C, the user A needs to retrieve again the file package corresponding to the 900 files and the file package corresponding to the 100 files, where the file package corresponding to the 900 files and the file package corresponding to the 100 files have been already uploaded to the cloud server, separately decrypts the file packages to acquire the total of 1000 files in the two file packages, and then shares files with the user C by using a method similar to that used to share the files with the user B. This process is cumbersome and inefficient.

SUMMARY

Embodiments of the present disclosure provide a file sharing method and apparatus, to solve a problem that a process is cumbersome and inefficient because a file that has already been saved needs to be changed when a file is shared by using a cloud server.

According to a first aspect, a file sharing method is provided, including separately encrypting, by a first terminal, one or more files by using a corresponding shared key, to obtain a corresponding encrypted file, uploading each obtained encrypted file to a server for saving, and receiving a uniform resource locator URL that is returned by the server and corresponds to a location for saving each encrypted file, generating, by the first terminal, a key package of a file to be shared, where the file to be shared comes from the one or more files, and the key package includes a shared key and a URL that correspond to the file to be shared, and providing the key package for a second terminal, so that the second terminal acquires a corresponding encrypted file from the server according to the URL included in the key package, and decrypts the acquired encrypted file by using the shared key included in the key package, where the second terminal is a terminal that intends to acquire the file to be shared.

With reference to the first aspect, in a first possible implementation manner, the providing the key package for a second terminal includes encrypting the key package, and transmitting the encrypted key package to the second terminal, so that the second terminal decrypts the encrypted key package.

With reference to the first aspect, in a second possible implementation manner, the providing the key package for a second terminal includes encrypting, by the first terminal, the key package by using a public key of the first terminal, acquiring a public key of the second terminal, generating a proxy key according to a private key of the first terminal and the public key of the second terminal, and uploading the encrypted key package and the proxy key to the server, so that the server performs proxy re-encryption on the encrypted key package by using the proxy key, and provides, for the second terminal, the key package on which the proxy re-encryption has been performed, and then the second terminal decrypts, by using a private key of the second terminal, the key package on which the proxy re-encryption has been performed.

With reference to the first aspect, in a third possible implementation manner, the server includes a cloud server and a trusted server that is used for storing a key package, the uploading each obtained encrypted file to a server for saving includes uploading each obtained encrypted file to the cloud server for saving, and the providing the key package for a second terminal includes uploading the key package to the trusted server, receiving a URL that is returned by the trusted server and corresponds to a location for saving the key package, and sending, to the second terminal, the URL corresponding to the location for saving the key package, so that the second terminal acquires the key package from the trusted server according to the URL corresponding to the location for saving the key package.

With reference to the third possible implementation manner, in a fourth possible implementation manner, before the sending, to the second terminal, the URL corresponding to the location for saving the key package, the method further includes sending, by the first terminal, an authorization message for the second terminal to the trusted server, to permit the second terminal to acquire the key package from the trusted server.

According to a second aspect, a file sharing method is provided, including receiving and saving, by a cloud server, one or more encrypted files separately uploaded by a first terminal, where the one or more encrypted files are obtained by the first terminal by encrypting one or more files by using a corresponding shared key, returning, by the cloud server to the first terminal, a uniform resource locator URL corresponding to a location for saving the one or more encrypted files, receiving a key package, which is uploaded by the first terminal, of a file to be shared, where the file to be shared comes from the one or more files, and the key package includes a shared key and a URL that correspond to the file to be shared, and providing, by the cloud server, the key package for a second terminal, so that the second terminal acquires a corresponding encrypted file from the cloud server by using the URL in the key package, and decrypts the acquired encrypted file by using the shared key in the key package, where the second terminal is a terminal that intends to acquire the file to be shared.

With reference to the second aspect, in a first possible implementation manner, the receiving a key package, which is uploaded by the first terminal, of a file to be shared includes receiving the key package that is uploaded by the first terminal and encrypted by using a public key of the first terminal, and receiving a proxy key uploaded by the first terminal, where the proxy key is generated by the first terminal according to a private key of the first terminal and a public key of the second terminal, and the providing, by the cloud server, the key package for a second terminal includes performing, by the cloud server, proxy re-encryption on the encrypted key package by using the proxy key, and providing, for the second terminal, the key package on which the proxy re-encryption has been performed, so that the second terminal decrypts, by using a private key of the second terminal, the key package on which the proxy re-encryption has been performed.

According to a third aspect, a file sharing method is provided, including receiving, by a trusted server for storing a key package, a key package uploaded by a first terminal, where the key package includes a shared key corresponding to a file to be shared, and a uniform resource locator URL corresponding to a location at which a cloud server saves an encrypted file corresponding to the file to be shared, and providing, by the trusted server, the key package for a second terminal, so that the second terminal acquires a corresponding encrypted file from the cloud server according to the URL carried in the key package, and decrypts the acquired encrypted file by using the shared key carried in the key package.

With reference to the third aspect, in a first possible implementation manner, before the providing, by the trusted server, the key package for a second terminal, the method further includes receiving, by the trusted server, an authorization message for the second terminal sent by the first terminal, where the authorization message is used to permit the second terminal to acquire the key package from the trusted server.

According to a fourth aspect, a file sharing apparatus is provided, including an encrypting module configured to separately encrypt one or more files by using a corresponding shared key, to obtain a corresponding encrypted file, a transmitting module configured to upload each encrypted file obtained by the encrypting module to a server for saving, and receive a uniform resource locator URL that is returned by the server and corresponds to a location for saving each encrypted file, a generating module configured to generate a key package of a file to be shared, where the file to be shared comes from the one or more files, and the key package includes a shared key and a URL that correspond to the file to be shared, and a sharing module configured to provide, for a second terminal, the key package generated by the generating module, so that the second terminal acquires a corresponding encrypted file from the server according to the URL included in the key package, and decrypts the acquired encrypted file by using the shared key included in the key package, where the second terminal is a terminal that intends to acquire the file to be shared.

With reference to the fourth aspect, in a first possible implementation manner, the sharing module is configured to encrypt the key package, and transmit the encrypted key package to the second terminal, so that the second terminal decrypts the encrypted key package.

With reference to the fourth aspect, in a second possible implementation manner, the sharing module is configured to encrypt the key package by using a public key of the file sharing apparatus; acquire a public key of the second terminal; generate a proxy key according to a private key of the file sharing apparatus and the public key of the second terminal; and upload the encrypted key package and the proxy key to the server, so that the server performs proxy re-encryption on the encrypted key package by using the proxy key, and provides, for the second terminal, the key package on which the proxy re-encryption has been performed, and then the second terminal decrypts, by using a private key of the second terminal, the key package on which the proxy re-encryption has been performed.

With reference to the fourth aspect, in a third possible implementation manner, the server includes a cloud server and a trusted server that is used for storing a key package, the transmitting module is configured to upload each obtained encrypted file to the cloud server for saving, and the sharing module is configured to upload the key package to the trusted server, receive a URL that is returned by the trusted server and corresponds to a location for saving the key package, and send, to the second terminal, the URL corresponding to the location for saving the key package, so that the second terminal acquires the key package from the trusted server according to the URL corresponding to the location for saving the key package.

With reference to the third possible implementation manner, in a fourth possible implementation manner, the sharing module is further configured to: before sending, to the second terminal, the URL corresponding to the location for saving the key package, send an authorization message for the second terminal to the trusted server, to permit the second terminal to acquire the key package from the trusted server.

According to a fifth aspect, a terminal is provided, including the file sharing apparatus according to the fourth aspect and any one of the first to fourth possible implementation manners of the fourth aspect.

According to a sixth aspect, a file sharing apparatus is provided, including a first receiving module configured to receive and save one or more encrypted files separately uploaded by a first terminal, where the one or more encrypted files are obtained by the first terminal by encrypting one or more files by using a corresponding shared key, a sending module configured to return, to the first terminal, a uniform resource locator URL corresponding to a location for saving the one or more encrypted files, a second receiving module configured to receive a key package, which is uploaded by the first terminal, of a file to be shared, where the file to be shared comes from the one or more files, and the key package includes a shared key and a URL that correspond to the file to be shared, and a providing module configured to provide the key package for a second terminal, so that the second terminal acquires a corresponding encrypted file from the file sharing apparatus by using the URL in the key package, and decrypts the acquired encrypted file by using the shared key in the key package, where the second terminal is a terminal that intends to acquire the file to be shared.

With reference to the sixth aspect, in a first possible implementation manner, the second receiving module is configured to receive the key package that is uploaded by the first terminal and encrypted by using a public key of the first terminal, and receive a proxy key uploaded by the first terminal, where the proxy key is generated by the first terminal according to a private key of the first terminal and a public key of the second terminal, and the providing module is configured to perform proxy re-encryption on the encrypted key package by using the proxy key, and provide, for the second terminal, the key package on which the proxy re-encryption has been performed, so that the second terminal decrypts, by using a private key of the second terminal, the key package on which the proxy re-encryption has been performed.

According to a seventh aspect, a cloud server is provided, including the file sharing apparatus according to the sixth aspect or the first possible implementation manner of the sixth aspect.

According to an eighth aspect, a file sharing apparatus is provided, including a receiving module configured to receive a key package uploaded by a first terminal, where the key package includes a shared key corresponding to a file to be shared, and a uniform resource locator URL corresponding to a location at which a cloud server saves an encrypted file corresponding to the file to be shared, and a providing module configured to provide, for a second terminal, the key package received by the receiving module, so that the second terminal acquires a corresponding encrypted file from the cloud server according to the URL carried in the key package, and decrypts the acquired encrypted file by using the shared key carried in the key package.

With reference to the eighth aspect, in a first possible implementation manner, the receiving module is further configured to: before the providing module provides the key package for the second terminal, receive an authorization message for the second terminal sent by the first terminal, where the authorization message is used to permit the second terminal to acquire the key package from a trusted server.

According to a ninth aspect, a trusted server is provided, including the file sharing apparatus according to the eighth aspect or the first possible implementation manner of the eighth aspect.

According to the file sharing method and apparatus provided in the embodiments of the present disclosure, a first terminal uploads each encrypted file to a server for saving, and receives a URL that is returned by the server and corresponds to a location for saving each encrypted file; generates a key package that includes a shared key and a URL that correspond to a file to be shared; and provides the key package for a second terminal, so that the second terminal acquires a corresponding encrypted file by using the URL in the key package, and decrypts the acquired encrypted file by using the shared key in the key package. By using the foregoing method, during file sharing, the first terminal does not need to change a file that has already been saved on the server, so that a process is simple and file sharing efficiency can be effectively improved.

DESCRIPTION OF EMBODIMENTS

Embodiments of the present disclosure provide a file sharing method and apparatus. A first terminal uploads each encrypted file to a server for saving, and receives a URL that is returned by the server and corresponds to a location for saving each encrypted file; generates a key package that includes a shared key and a URL that correspond to a file to be shared; and provides the key package for a second terminal, so that the second terminal acquires a corresponding encrypted file by using the URL in the key package, and decrypts the acquired encrypted file by using the shared key in the key package. By using the foregoing method, during file sharing, the first terminal does not need to change a file that has already been saved on the server, so that a process is simple and file sharing efficiency can be effectively improved.

The following describes the embodiments of the present disclosure in detail with reference to the accompanying drawings in this specification.

Figure 1:
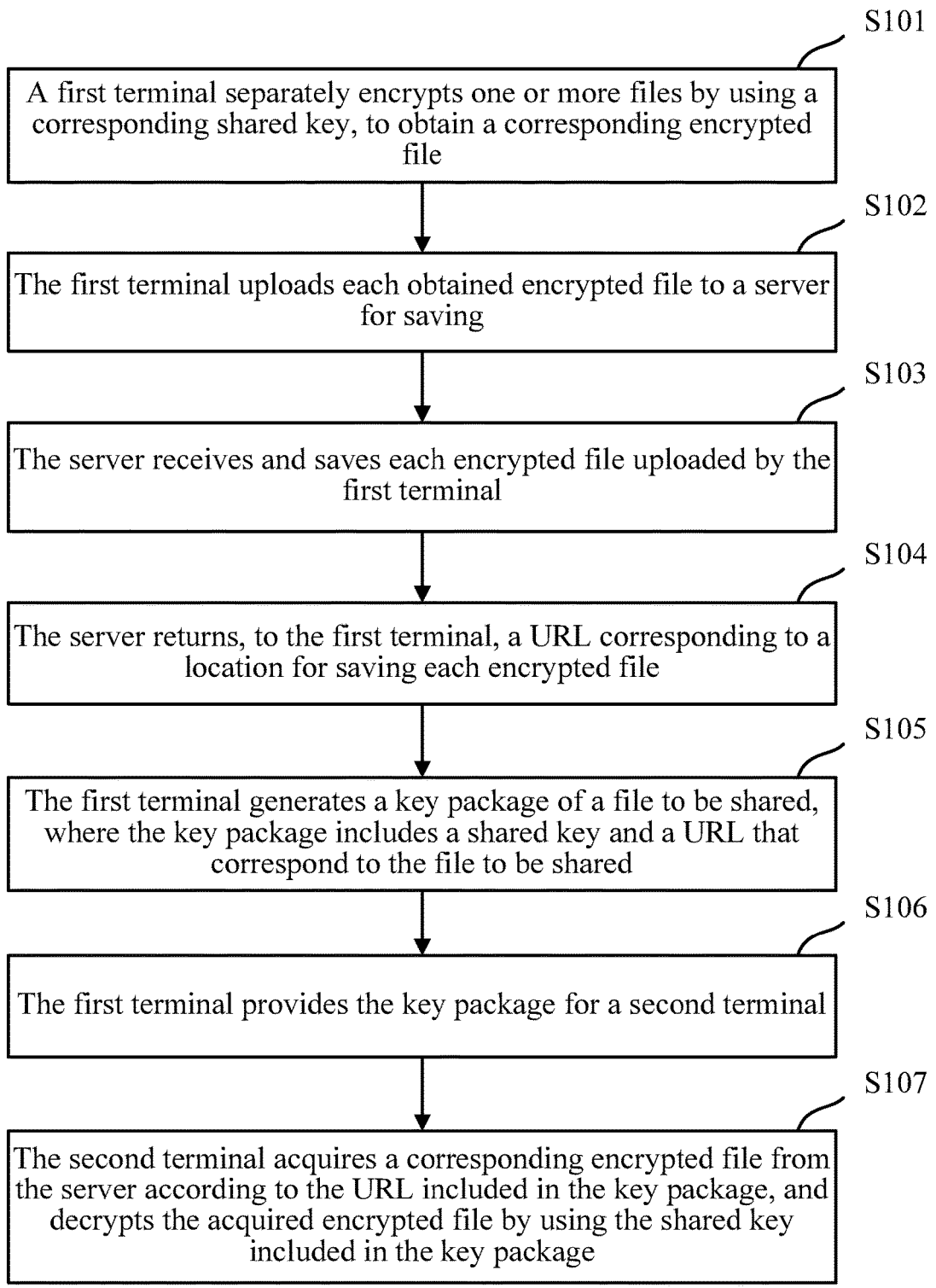
FIG. 1 shows a file sharing process according to an embodiment of the present disclosure.

FIG. 1 shows a file sharing process according to an embodiment of the present disclosure, and the following steps are included S101: A first terminal separately encrypts one or more files by using a corresponding shared key, to obtain a corresponding encrypted file.

In this embodiment of the present disclosure, when uploading one or more files to a server for saving, the first terminal first needs to encrypt each file. The first terminal may generate, for each file, a shared key corresponding to the file, and encrypt the file by using the generated shared key, to obtain a corresponding encrypted file.

It may also be that multiple shared keys are saved in advance, and for each file, one shared key is selected in a rotating or random manner from the multiple saved shared keys as a shared key corresponding to the file; and the file is encrypted by using the shared key corresponding to the file, to obtain a corresponding encrypted file.

S102: The first terminal uploads each obtained encrypted file to a server for saving.

S103: The server receives and saves each encrypted file uploaded by the first terminal.

S104: The server returns, to the first terminal, a URL corresponding to a location for saving each encrypted file.

After encrypting each file to obtain an encrypted file, the first terminal uploads each obtained encrypted file to the server for saving. The server allocates, for each received encrypted file, a location for saving the encrypted file, saves the encrypted file to the allocated location, and then returns a URL corresponding to the location to the first terminal. The first terminal receives the URL that is returned by the server and corresponds to the location for saving each encrypted file.

Until now, the first terminal has encrypted each file and uploaded the file to the server for saving.

S105: The first terminal generates a key package of a file to be shared, where the key package includes a shared key and a URL that correspond to the file to be shared.

The file to be shared comes from the one or more files in step S101, and the URL corresponding to the file to be shared is a URL of a location at which the server saves an encrypted file corresponding to the file to be shared.

S106: The first terminal provides the key package for a second terminal.

The second terminal is a terminal that intends to acquire the file to be shared.

In this embodiment of the present disclosure, when the first terminal intends to share the file to be shared in the one or more files in step S101 with the second terminal, the first terminal first generates the key package that includes the shared key and the URL that correspond to the file to be shared, and then provides the key package for the second terminal. Which file in the one or more files in step S101 is used as the file to be shared with the second terminal may be determined by a user that uses the first terminal.

For example, files that the first terminal intends to upload are five files in total, that is, d1 to d5, shared keys corresponding to the five files are K1 to K5 respectively, and d1 to d5 are encrypted by using K1 to K5 to obtain encrypted files D1 to D5; and after uploading D1 to D5 to the server for saving, the first terminal receives URL1 to URL5 that are returned by the server and correspond to locations for saving D1 to D5. When the user that uses the first terminal intends to share d1 to d3 with the second terminal (in this case, d1 to d3 are files to be shared), the first terminal generates a key package that includes the shared keys K1 to K3 corresponding to d1 to d3 respectively and includes URL1 to URL3 corresponding to D1 to D3 respectively. A format of the generated key package may be shown in Table 1.

TABLE 1

| URL Corresponding to Encrypted File | Shared Key Corresponding to Encrypted File |
|---|---|
| URL1 | K1 |
| URL2 | K2 |
| URL3 | K3 |

In Table 1, the first column of each line shows a URL corresponding to a file to be shared, and the second column of each line shows a shared key corresponding to the file to be shared. The format of the key package shown in Table 1 is merely an example, and the format of the key package is not limited in the present disclosure.

In addition, in this embodiment of the present disclosure, a method for providing the generated key package for the second terminal by the first terminal may be that the first terminal directly transmits the key package to the second terminal; or the first terminal uploads the key package to the server, and then the server sends the key package to the second terminal; or the first terminal uploads the key package to the server, and receives a URL that is returned by the server and corresponds to a location for saving the key package, and then the first terminal sends, to the second terminal, the URL corresponding to the location at which the server saves the key package, so that the second terminal acquires the key package from the server according to the URL corresponding to the location at which the server saves the key package.

S107: The second terminal acquires a corresponding encrypted file from the server according to the URL included in the key package, and decrypts the acquired encrypted file by using the shared key included in the key package.

After receiving the key package transmitted by the first terminal, the second terminal may acquire a corresponding encrypted file from the server according to the URL in the key package, and decrypt the acquired encrypted file by using the shared key in the key package.

Table 1 is still used as an example for description. After acquiring the key package shown in Table 1, the second terminal may acquire the encrypted file D1 by using URL1, and decrypt D1 by using K1 to obtain the file to be shared d1; and similarly, the second terminal may acquire the encrypted file D2 by using URL2, and decrypt D2 by using K2 to obtain the file to be shared d2; and acquire the encrypted file D3 by using URL3, and decrypt D3 by using K3 to obtain the file to be shared d3.

Until now, the first terminal has shared, with the second terminal, the file to be shared.

As can be seen from the process shown in FIG. 1, instead of compressing files into one file package and encrypting and uploading the file package, a first terminal encrypts each file and uploads the file to a cloud server for saving; therefore, each encrypted file corresponds to a URL, and when sharing a file with a second terminal, the first terminal needs to provide, for the second terminal by using the server, only a key package that carries a URL and a shared key that correspond to the file to be shared, and the second terminal can obtain the corresponding file by using the URL and the shared key in the key package. In the entire process, a file uploaded by the first terminal to the server does not need to be modified at all, and moreover, even if the first terminal needs to share different files with other different terminals, the first terminal neither need to repeatedly acquire an encrypted file that has already been uploaded to the server nor need to upload the file again. Therefore, according to the file sharing method provided in this embodiment of the present disclosure, a process is simple and file sharing efficiency can be effectively improved.

Figure 2:
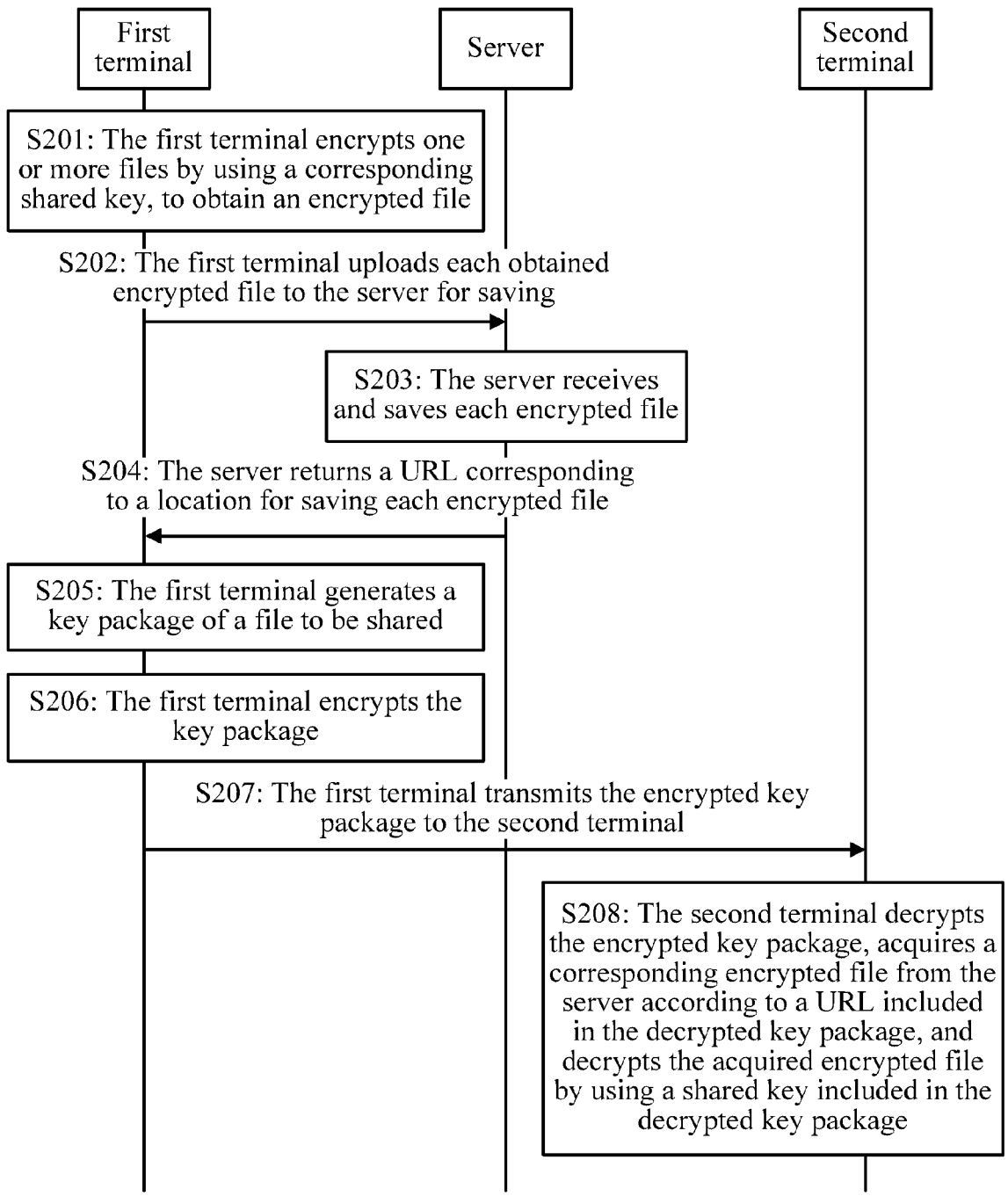
FIG. 2 shows a file sharing process when a first terminal directly transmits a key package to a second terminal according to an embodiment of the present disclosure.

Further, in this embodiment of the present disclosure, in step S106 shown in FIG. 1, when the first terminal directly transmits the key package to the second terminal, to ensure security of the encrypted file that is saved on the server and corresponds to the file to be shared, the first terminal may encrypt the key package and transmit the encrypted key package to the second terminal, so that the second terminal decrypts the encrypted key package; and the second terminal acquires the corresponding encrypted file from the server according to the URL included in the decrypted key package, and decrypts the acquired encrypted file by using the shared key included in the decrypted key package, as shown in FIG. 2.

FIG. 2 shows a file sharing process when a first terminal directly transmits a key package to a second terminal according to an embodiment of the present disclosure, and the following steps are included S201: A first terminal separately encrypts one or more files by using a corresponding shared key, to obtain an encrypted file.

S202: The first terminal uploads each obtained encrypted file to a server for saving.

S203: The server receives and saves each encrypted file uploaded by the first terminal.

S204: The server returns, to the first terminal, a URL corresponding to a location for saving each encrypted file.

S205: The first terminal generates a key package of a file to be shared.

The file to be shared comes from the one or more files in step S201, and the key package includes a shared key and a URL that correspond to the file to be shared.

S206: The first terminal encrypts the key package.

For example, the first terminal may acquire a public key of a second terminal, and encrypt the key package by using the public key of the second terminal.

S207: The first terminal transmits the encrypted key package to the second terminal.

S208: The second terminal decrypts the encrypted key package, acquires a corresponding encrypted file from the server according to the URL included in the decrypted key package, and decrypts the acquired encrypted file by using the shared key included in the decrypted key package.

The foregoing example is used again. Because the first terminal encrypts the key package by using the public key of the second terminal, the second terminal may decrypt the encrypted key package by using a private key of the second terminal, to acquire the URL and the shared key that are included in the decrypted key package, acquire the corresponding encrypted file from the server according to the acquired URL, and decrypt the acquired encrypted file by using the acquired shared key.

In addition, in this embodiment of the present disclosure, the server shown in FIG. 1 may be a cloud server, and to ensure security of an encrypted file that is uploaded by the first terminal to the cloud server and corresponds to the file to be shared, after generating the key package that carries the URL and the shared key that correspond to the file to be shared, the first terminal may further encrypt the key package, and then send the encrypted key package to the cloud server. after generating the key package that carries the URL and the shared key that correspond to the file to be shared, the first terminal may encrypt the key package by using a public key of the first terminal, acquire the public key of the second terminal, generate a proxy key by means of proxy re-encryption according to a private key of the first terminal and the public key of the second terminal, and upload the encrypted key package and the proxy key to the cloud server. The cloud server performs, by using the proxy key, proxy re-encryption on the received encrypted key package, and provides, for the second terminal, the key package on which the proxy re-encryption has been performed, as shown in FIG. 3.

Figure 3:
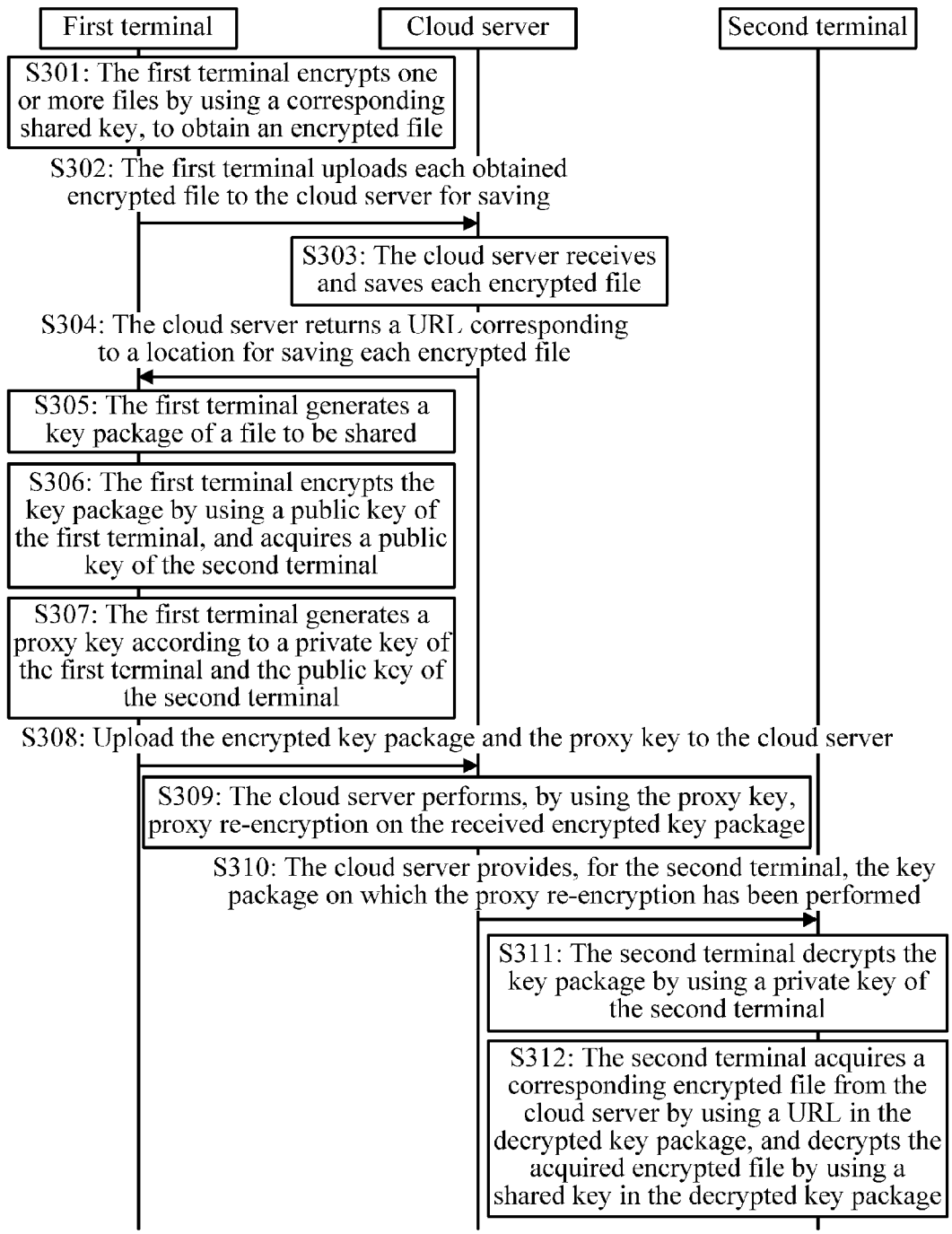
FIG. 3 shows a file sharing process when proxy re-encryption is performed on a key package according to an embodiment of the present disclosure.

FIG. 3 shows a file sharing process when proxy re-encryption is performed on a key package according to an embodiment of the present disclosure, and the following steps are included S301: A first terminal encrypts one or more files by using a corresponding shared key, to obtain a corresponding encrypted file.

S302: The first terminal uploads each obtained encrypted file to a cloud server for saving.

S303: The cloud server receives and saves each encrypted file uploaded by the first terminal.

S304: The cloud server returns, to the first terminal, a URL corresponding to a location for saving each encrypted file.

S305: The first terminal generates a key package of a file to be shared.

The file to be shared comes from the one or more files in step S301, and the key package carries a shared key and a URL that correspond to the file to be shared.

S306: The first terminal encrypts the key package by using a public key of the first terminal, and acquires a public key of a second terminal.

A method for acquiring the public key of the second terminal by the first terminal may be acquiring the public key of the second terminal from a certification authority (CA), or directly acquiring the public key of the second terminal from the second terminal, which is not limited in this embodiment of the present disclosure.

S307: The first terminal generates a proxy key according to a private key of the first terminal and the public key of the second terminal.

S308: The first terminal uploads the encrypted key package and the proxy key to the cloud server.

S309: The cloud server performs, by using the proxy key, proxy re-encryption on the received encrypted key package.

S310: The cloud server provides, for the second terminal, the key package on which the proxy re-encryption has been performed.

S311: The second terminal decrypts the key package by using a private key of the second terminal.

Proxy re-encryption is performed on the key package by using the proxy key, and the proxy key is generated by using the private key of the first terminal and the public key of the second terminal; therefore, after receiving the key package which is sent by the cloud server and on which the proxy re-encryption has been performed, the second terminal may directly decrypt the key package by using the private key of the second terminal, and subsequently, the second terminal may acquire a corresponding encrypted file by using the URL in the decrypted key package, and decrypt the acquired encrypted file by using the shared key in the decrypted key package.

S312: The second terminal acquires the corresponding encrypted file from the cloud server by using the URL in the decrypted key package, and decrypts the acquired encrypted file by using the shared key in the decrypted key package.

By using the foregoing method, after the proxy re-encryption is performed on the key package, except for the second terminal, no terminal or server (including the cloud server) can decrypt the key package on which the proxy re-encryption has been performed. This ensures that the shared key carried in the key package on which the proxy re-encryption has been performed is not leaked. Therefore, it can be ensured that the encrypted file uploaded by the first terminal to the cloud server is not decrypted, and security of the encrypted file uploaded by the first terminal can be effectively improved.

In addition, in the file sharing process shown in FIG. 3, after receiving the key package sent by the first terminal and performs proxy re-encryption on the key package, a server (which may be the cloud server) may further send, to the first terminal, a URL corresponding to a location at which the server saves the key package on which the proxy re-encryption has been performed; the first terminal receives the URL that is returned by the server and corresponds to the location for saving the key package on which the proxy re-encryption has been performed, and sends, to the second terminal, the URL corresponding to the location for saving the key package on which the proxy re-encryption has been performed; and the second terminal sends, to the cloud server, a request message that carries the URL corresponding to the location for saving the key package on which the proxy re-encryption has been performed, to request the key package from the server. After receiving the request message sent by the second terminal, the server provides, for the second terminal, the key package on which the proxy re-encryption has been performed.

Further, to ensure security of the encrypted file uploaded by the first terminal to the server, before sending, to the second terminal, the URL corresponding to the location for saving the key package on which the proxy re-encryption has been performed, the first terminal may further send an authorization message for the second terminal to the server, where the authorization message is used to permit the second terminal to acquire, from the server, the key package on which the proxy re-encryption has been performed. Correspondingly, before providing, for the second terminal, the key package on which the proxy re-encryption has been performed, the server further authenticates the second terminal; when determining that the second terminal has permission to acquire the key package on which the proxy re-encryption has been performed, the server provides, for the second terminal, the key package on which the proxy re-encryption has been performed; and if determining that the second terminal has no permission to acquire the key package on which the proxy re-encryption has been performed, the server refuses to provide, for the second terminal, the key package on which the proxy re-encryption has been performed.

In addition, to ensure that the encrypted file uploaded to the cloud server is not decrypted, in addition to the methods for encrypting the key package that are shown in FIG. 2 and FIG. 3, the first terminal may not encrypt the key package, but needs to send the key package to a trusted server for storing a key package (where the trusted server is different from the cloud server), so that the trusted server saves the key package and provides the key package for the second terminal. In this case, the server in this embodiment of the present disclosure includes two servers in total, namely, the trusted server and the cloud server, where the cloud server is configured to store an encrypted file and the trusted server is configured to store a key package. In this case, a file sharing process is shown in FIG. 4.

Figure 4:
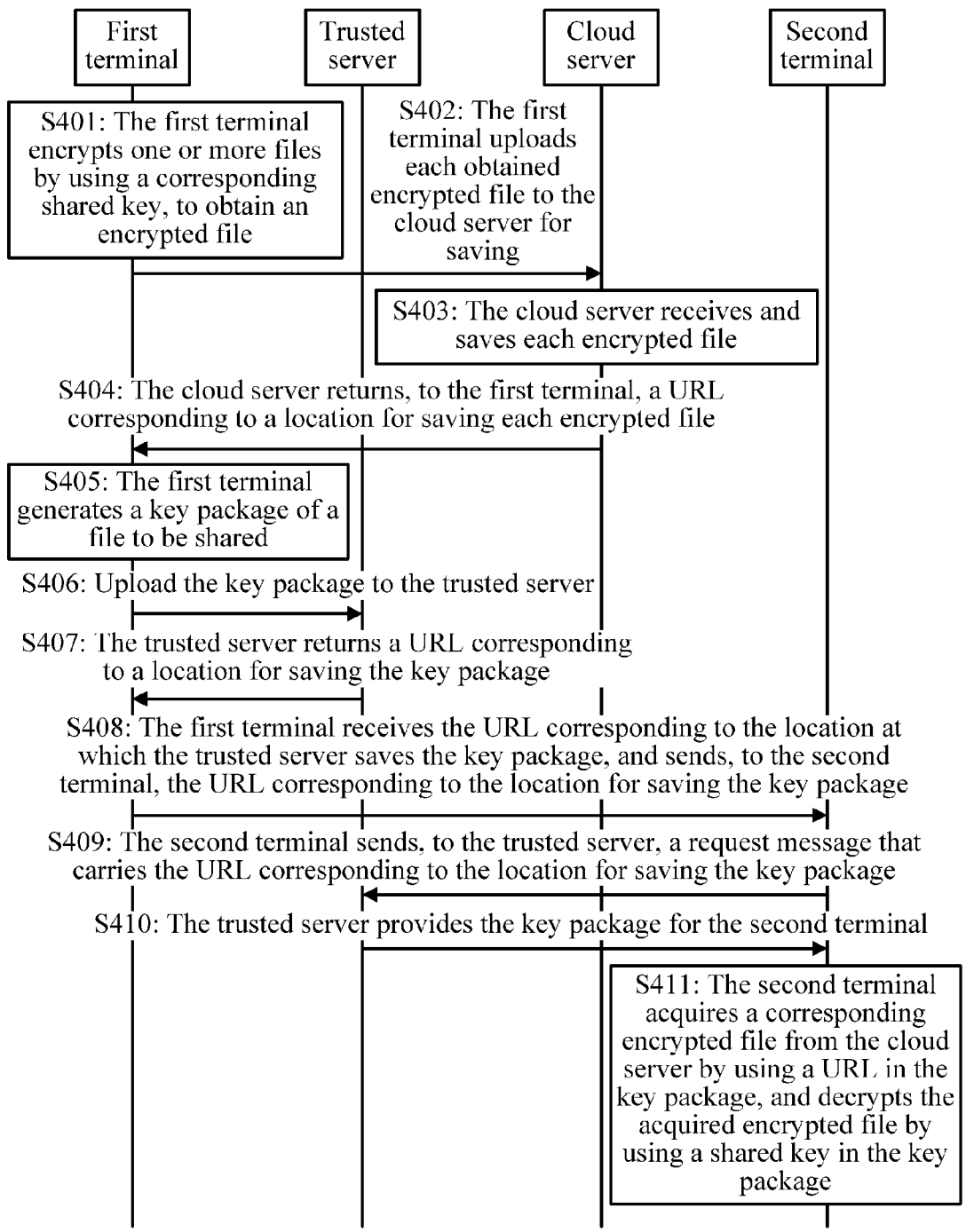
FIG. 4 shows a file sharing process when a first terminal sends a key package to a trusted server according to an embodiment of the present disclosure.

FIG. 4 shows a file sharing process when a first terminal sends a key package to a trusted server according to an embodiment of the present disclosure, and the following steps are included S401: A first terminal separately encrypts one or more files by using a corresponding shared key, to obtain a corresponding encrypted file.

S402: The first terminal uploads each obtained encrypted file to a cloud server for saving.

S403: The cloud server receives and saves each encrypted file uploaded by the first terminal.

S404: The cloud server returns, to the first terminal, a URL corresponding to a location for saving each encrypted file.

S405: The first terminal generates a key package of a file to be shared.

The file to be shared comes from the one or more files in step S401, and the key package carries a shared key and a URL that correspond to the file to be shared.

S406: The first terminal uploads the key package to a trusted server.

S407: The trusted server receives and saves the key package, and returns, to the first terminal, a URL corresponding to a location for saving the key package.

S408: The first terminal receives the URL corresponding to the location at which the trusted server saves the key package, and sends, to a second terminal, the URL corresponding to the location for saving the key package.

S409: The second terminal sends, to the trusted server, a request message that carries the URL corresponding to the location for saving the key package.

S410: The trusted server provides the key package for the second terminal.

S411: The second terminal acquires a corresponding encrypted file from the cloud server by using the URL in the key package, and decrypts the acquired encrypted file by using the shared key in the key package.

As can be seen, a difference from the file sharing methods shown in FIG. 2 and FIG. 3 lies in that, to ensure security of a file uploaded by the first terminal to the cloud server, the third file sharing method is not that the key package is encrypted and then provided for the second terminal; but is that, the key package is directly uploaded to the trusted server without a need of encrypting the key package, and the second terminal acquires the key package from the trusted server, which can further improve file sharing efficiency.

Certainly, in the process shown in FIG. 4, the first terminal may also encrypt the key package, and upload the encrypted key package to the trusted server; the trusted server provides the encrypted key package for the second terminal; and the second terminal may decrypt the encrypted key package, then acquire the corresponding encrypted file from the cloud server by using the URL in the decrypted key package, and decrypt the acquired encrypted file by using the shared key in the decrypted key package.

Further, in the process shown in FIG. 4, before sending, to the second terminal, the URL corresponding to the location at which the trusted server saves the key package, the first terminal may further send an authorization message for the second terminal to the trusted server, where the authorization message is used to permit the second terminal to acquire the key package from the trusted server. Correspondingly, before providing the key package for the second terminal, the trusted server further needs to authenticate the second terminal; when determining that the second terminal has permission to acquire the key package, the trusted server provides the key package for the second terminal; and if determining that the second terminal has no permission to acquire the key package, the trusted server refuses to provide the key package for the second terminal.

Figure 5:
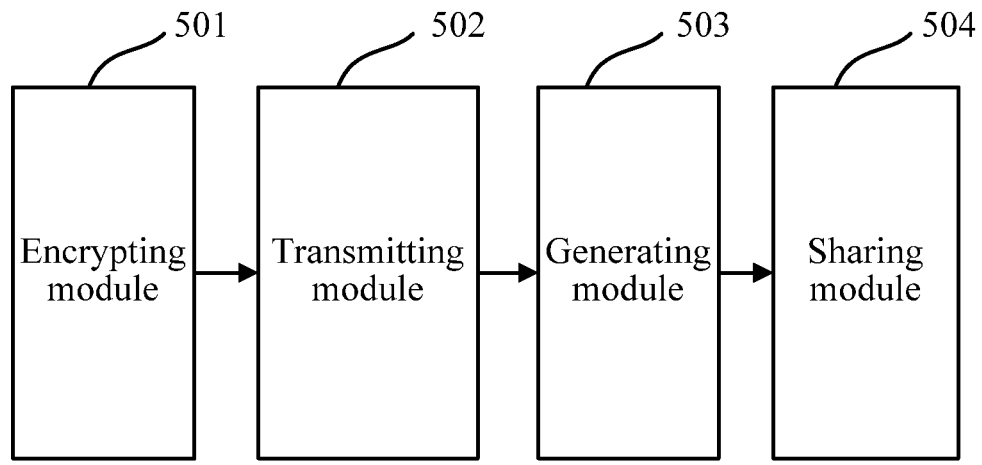
FIG. 5 is a schematic structural diagram of a first type of file sharing apparatus according to an embodiment of the present disclosure.
Figure 6:
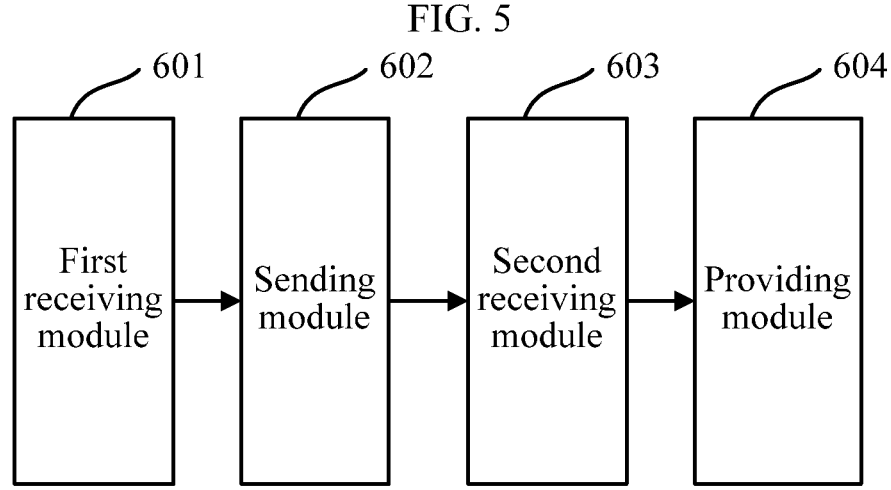
FIG. 6 is a schematic structural diagram of a second type of file sharing apparatus according to an embodiment of the present disclosure.
Figure 7:
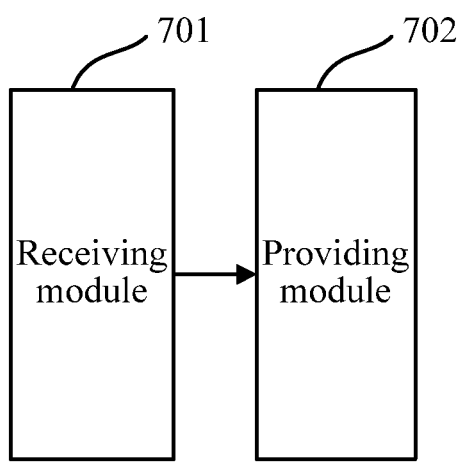
FIG. 7 is a schematic structural diagram of a third type of file sharing apparatus according to an embodiment of the present disclosure.

The foregoing describes the file sharing methods provided in the embodiments of the present disclosure, and based on the same inventive idea, the embodiments of the present disclosure further provide corresponding file sharing apparatuses, as shown in FIG. 5, FIG. 6, and FIG. 7.

FIG. 5 is a schematic structural diagram of a first type of file sharing apparatus according to an embodiment of the present disclosure. The apparatus includes an encrypting module 501 configured to separately encrypt one or more files by using a corresponding shared key, to obtain a corresponding encrypted file, a transmitting module 502 configured to upload each encrypted file obtained by the encrypting module 501 to a server for saving, and receive a uniform resource locator URL that is returned by the server and corresponds to a location for saving each encrypted file, a generating module 503 configured to generate a key package of a file to be shared, where the file to be shared comes from the one or more files, and the key package includes a shared key and a URL that correspond to the file to be shared, and a sharing module 504 configured to provide, for a second terminal, the key package generated by the generating module 503, so that the second terminal acquires a corresponding encrypted file from the server according to the URL included in the key package, and decrypts the acquired encrypted file by using the shared key included in the key package, where the second terminal is a terminal that intends to acquire the file to be shared.

The sharing module 504 is configured to encrypt the key package, and transmit the encrypted key package to the second terminal, so that the second terminal decrypts the encrypted key package.

The sharing module 504 is configured to encrypt the key package by using a public key of the file sharing apparatus; acquire a public key of the second terminal; generate a proxy key according to a private key of the file sharing apparatus and the public key of the second terminal; and upload the encrypted key package and the proxy key to the server, so that the server performs proxy re-encryption on the encrypted key package by using the proxy key, and provides, for the second terminal, the key package on which the proxy re-encryption has been performed, and then the second terminal decrypts, by using a private key of the second terminal, the key package on which the proxy re-encryption has been performed.

The server includes a cloud server and a trusted server that is used for storing a key package, the transmitting module 502 is configured to upload each obtained encrypted file to the cloud server for saving, and the sharing module 504 is configured to upload the key package to the trusted server, receive a URL that is returned by the trusted server and corresponds to a location for saving the key package, and send, to the second terminal, the URL corresponding to the location for saving the key package, so that the second terminal acquires the key package from the trusted server according to the URL corresponding to the location for saving the key package.

The sharing module 504 is further configured to before sending, to the second terminal, the URL corresponding to the location for saving the key package, send an authorization message for the second terminal to the trusted server, to permit the second terminal to acquire the key package from the trusted server.

The file sharing apparatus shown in FIG. 5 may be located in a terminal.

FIG. 6 is a schematic structural diagram of a second type of file sharing apparatus according to an embodiment of the present disclosure. The apparatus includes a first receiving module 601 configured to receive and save one or more encrypted files separately uploaded by a first terminal, where the one or more encrypted files are obtained by the first terminal by encrypting one or more files by using a corresponding shared key, a sending module 602 configured to return, to the first terminal, a uniform resource locator URL corresponding to a location for saving the one or more encrypted files, a second receiving module 603 configured to receive a key package, which is uploaded by the first terminal, of a file to be shared, where the file to be shared comes from the one or more files, and the key package includes a shared key and a URL that correspond to the file to be shared, and a providing module 604 configured to provide the key package for a second terminal, so that the second terminal acquires a corresponding encrypted file from the file sharing apparatus by using the URL in the key package, and decrypts the acquired encrypted file by using the shared key in the key package, where the second terminal is a terminal that intends to acquire the file to be shared.

The second receiving module 603 is configured to receive the key package that is uploaded by the first terminal and encrypted by using a public key of the first terminal, and receive a proxy key uploaded by the first terminal, where the proxy key is generated by the first terminal according to a private key of the first terminal and a public key of the second terminal, and the providing module 604 is configured to perform proxy re-encryption on the encrypted key package by using the proxy key, and provide, for the second terminal, the key package on which the proxy re-encryption has been performed, so that the second terminal decrypts, by using a private key of the second terminal, the key package on which the proxy re-encryption has been performed.

The file sharing apparatus shown in FIG. 6 may be located in a cloud server.

FIG. 7 is a schematic structural diagram of a third type of file sharing apparatus according to an embodiment of the present disclosure. The apparatus includes a receiving module 701 configured to receive a key package uploaded by a first terminal, where the key package includes a shared key corresponding to a file to be shared, and a uniform resource locator URL corresponding to a location at which a cloud server saves an encrypted file corresponding to the file to be shared, and a providing module 702 configured to provide, for a second terminal, the key package received by the receiving module 701, so that the second terminal acquires a corresponding encrypted file from the cloud server according to the URL carried in the key package, and decrypts the acquired encrypted file by using the shared key carried in the key package.

The receiving module 701 is further configured to before the providing module provides the key package for the second terminal, receive an authorization message for the second terminal sent by the first terminal, where the authorization message is used to permit the second terminal to acquire the key package from a trusted server.

The file sharing apparatus shown in FIG. 7 may be located in a trusted server.

According to the file sharing method and apparatus provided in the embodiments of the present disclosure, a first terminal uploads each encrypted file to a server for saving, and receives a URL that is returned by the server and corresponds to a location for saving each encrypted file; generates a key package that includes a shared key and a URL that correspond to a file to be shared; and provides the key package for a second terminal, so that the second terminal acquires a corresponding encrypted file by using the URL in the key package, and decrypts the acquired encrypted file by using the shared key in the key package. By using the foregoing method, during file sharing, the first terminal does not need to change a file that has already been saved on the server, so that a process is simple and file sharing efficiency can be effectively improved.

Persons skilled in the art should understand that the embodiments of the present disclosure may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a compact disc read-only memory (CD-ROM), an optical memory, and the like) that include computer-usable program code.

In a typical configuration, a computing device includes one or more processors, central processing unit (CPU), an input/output interface, a network interface, and a memory.

The memory may include the following forms of computer readable media: a non-persistent memory, a random access memory (RAM), and/or a non-volatile memory, for example, a read-only memory (ROM) or a flash memory (flash RAM). The memory is an example of a computer readable medium.

The computer readable media include persistent and non-persistent, and mobile and non-mobile media, and information storage may be implemented by using any method or technology. Information may be a computer readable instruction, a data structure, a program module, or other data. Examples of the computer storage media include, but are not limited to, a phase change memory (PRAM), a static random access memory (SRAM), a dynamic random access memory (DRAM), a RAM of another type, a ROM, an electrically erasable programmable read-only memory (EEPROM), a flash memory or other memory technologies, a CD-ROM, a digital versatile disc (DVD) or other optical storage, a magnetic cassette, a magnetic tape, a magnetic disk storage, or other magnetic storage devices, or any other non-transmission medium, and may be configured to store information that can be accessed by a computing device. As defined in this specification, the computer readable media do not include non-transitory computer readable media (transitory media), for example, modulated data signals and carriers.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although some exemplary embodiments of the present application have been described, persons skilled in the art can make changes and modifications to these embodiments once they learn the basic inventive concept. Therefore, the following claims are intended to be construed as to cover the exemplary embodiments and all changes and modifications falling within the scope of the present application.

Obviously, persons skilled in the art can make various modifications and variations to the embodiments of the present application without departing from the spirit and scope of the embodiments of the present application. The present application is intended to cover these modifications and variations provided that they fall within the protection scope defined by the following claims and their equivalent technologies.

What is claimed is:

1. A file sharing method, comprising:
   encrypting, by a first terminal, a first file by using a first shared key to obtain a first encrypted file;
   encrypting, by the first terminal, a second file by using a second shared key to obtain a second encrypted file;
   uploading, by the first terminal, the first encrypted file and the second encrypted file to a server;
   receiving, by the first terminal, a first uniform resource locator (URL) corresponds to a location for saving the first encrypted file and a second URL corresponds to a location for saving the second encrypted file from the server;
   generating, by the first terminal, a key package of a file to be shared, wherein the file to be shared comprises at least one of the first encrypted file and the second encrypted file, and wherein the key package comprises a shared key and a URL that correspond to the file to be shared; and
   providing, by the first terminal, the key package for a second terminal, comprising:
      encrypting, by the first terminal, the key package by using a public key of the first terminal to obtain an encrypted key package;
      acquiring, by the first terminal, a public key of the second terminal;
      generating, by the first terminal, a proxy key according to a private key of the first terminal and the public key of the second terminal; and
      uploading, by the first terminal, the encrypted key package and the proxy key to the server, so that the server performs proxy re-encryption on the encrypted key package by using the proxy key, and provides, for the second terminal, the key package on which the proxy re-encryption has been performed.

2. The method according to claim 1, wherein providing, by the first terminal, the key package for the second terminal comprises:
   encrypting, by the first terminal, the key package to obtain an encrypted key package;
   transmitting, by the first terminal, the encrypted key package to the second terminal.

3. The method according to claim 1, wherein the server comprises:
   a cloud server; and
   a trusted server used for storing a key package, wherein uploading, by the first terminal, the first encrypted file and the second encrypted file to a server comprises uploading, by the first terminal, the first encrypted file and the second encrypted file to the cloud server, and wherein providing, by the first terminal, the key package for the second terminal comprises:
   uploading, by the first terminal, the key package to the trusted server;
   receiving, by the first terminal, a URL that is returned by the trusted server and corresponds to a location for saving the key package; and
   sending, by the first terminal, to the second terminal, the URL corresponding to the location for saving the key package.

4. The method according to claim 3, wherein before sending, by the first terminal, to the second terminal, the URL corresponding to the location for saving the key package, the method further comprises sending, by the first terminal, an authorization message for the second terminal to the trusted server, to permit the second terminal to acquire the key package from the trusted server.

5. A file sharing method, comprising:
receiving, by a cloud server, a first encrypted file and a second encrypted file uploaded by a first terminal;
saving, by the cloud server, the first encrypted file and the second encrypted file;
returning, by the cloud server to the first terminal, a first uniform resource locator (URL) corresponds to a first location for saving the first encrypted file and a second URL corresponds to a second location for saving the second encrypted file;
receiving, by the cloud server, a key package of a file to be shared, which is uploaded by the first terminal and encrypted by using a public key of the first terminal, wherein the file to be shared comprises at least one of the first encrypted file and the second encrypted file, and wherein the key package comprises a shared key and a URL that correspond to the file to be shared;
receiving, by the cloud server, a proxy key uploaded by the first terminal, wherein the proxy key is generated by the first terminal according to a private key of the first terminal and a public key of the second terminal, wherein providing, by the cloud server, the key package for the second terminal comprises:
performing, by the cloud server, proxy re-encryption on the key package by using the proxy key; and
providing, by the cloud server, the key package on which the proxy re-encryption has been performed for the second terminal; and
providing, by the cloud server, the key package for a second terminal.

6. A file sharing apparatus, wherein the file sharing apparatus is comprised in a first terminal, the file sharing apparatus comprising:
a memory storing executable instructions;
a processor coupled to the memory and configured to:
encrypt a first file by using a first shared key to obtain a first encrypted file; and
encrypt a second file by using a second shared key to obtain a second encrypted file;
a transmitter coupled to the processor and configured to:
upload the first encrypted file and the second encrypted file to a server; and
receive a first uniform resource locator (URL) corresponds to a first location for saving the first encrypted file and a second URL corresponds to a second location for saving the second encrypted file from the server,
wherein the processor is further configured to:
generate a key package of a file to be shared, wherein the file to be shared comprises at least one of the first encrypted file and the second encrypted file, and wherein the key package comprises a shared key and a URL that correspond to the file to be shared;
provide the key package for a second terminal;
encrypt the key package by using a public key of the first terminal to obtain an encrypted key package;
acquire a public key of the second terminal;
generate a proxy key according to a private key of the first terminal and the public key of the second terminal; and
upload the encrypted key package and the proxy key to the server, so that the server performs proxy re-encryption on the encrypted key package by using the proxy key, and provides, for the second terminal, the key package on which the proxy re-encryption has been performed.

7. The apparatus according to claim 6, wherein the processor is further configured to:
encrypt the key package to obtain an encrypted key package; and
transmit the encrypted key package to the second terminal.

8. The apparatus according to claim 6, wherein the server comprises:
a cloud server; and
a trusted server used for storing a key package, wherein the transmitter is further configured to upload the first encrypted file and the second encrypted file to the cloud server, and wherein the processor is further configured to:
upload the key package to the trusted server;
receive a URL that is returned by the trusted server and corresponds to a location for saving the key package; and
send, to the second terminal, the URL corresponding to the location for saving the key package.

9. The apparatus according to claim 8, wherein before sending, to the second terminal, the URL corresponding to the location for saving the key package, the processor is further configured to send an authorization message for the second terminal to the trusted server to permit the second terminal to acquire the key package from the trusted server.

10. A file sharing apparatus, comprising:
a first receiver configured to receive and save a first encrypted file and a second encrypted file uploaded by a first terminal;
a transmitter configured to return, to the first terminal, a first uniform resource locator (URL) corresponds to a first location for saving the first encrypted file and a second URL corresponds to a second location for saving the second encrypted file;
a second receiver configured to:
receive a key package of a file to be shared uploaded by the first terminal and encrypted by using a public key of the first terminal, wherein the file to be shared comprises at least one of the first encrypted file and the second encrypted file, and wherein the key package comprises a shared key and a URL that correspond to the file to be shared; and
receive a proxy key uploaded by the first terminal, wherein the proxy key is generated by the first terminal according to a private key of the first terminal and a public key of the second terminal; and
a processor coupled to the first receiver, the second receiver, and the transmitter and configured to:
provide the key package for a second terminal;
perform proxy re-encryption on the key package by using the proxy key; and
provide, for the second terminal, the key package on which the proxy re-encryption has been performed.

* * * * *